April 27, 1948.  A. DOBLE  2,440,328
SPEED AND CUT-OFF CONTROL MEANS FOR STEAM ENGINES AND THE LIKE
Filed Jan. 17, 1944  3 Sheets-Sheet 3
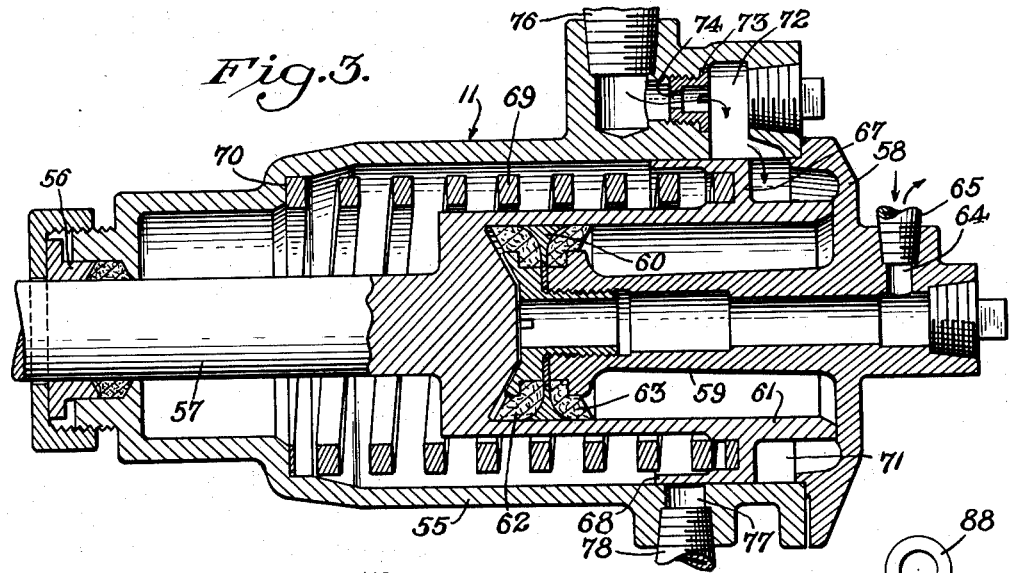
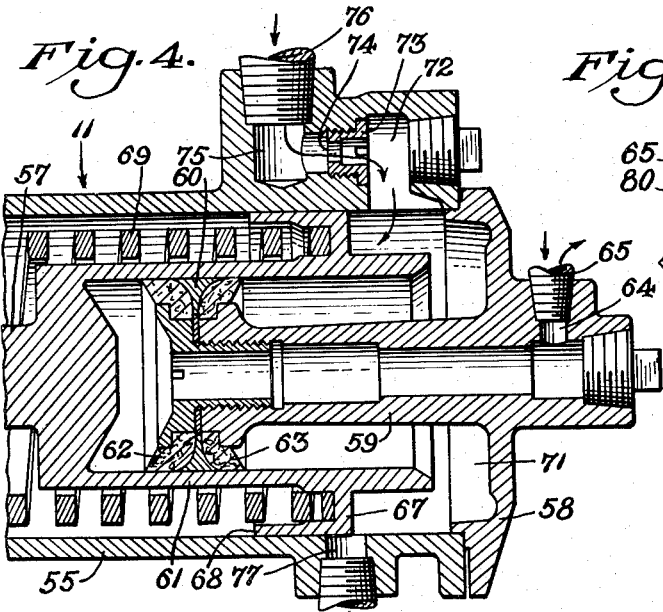
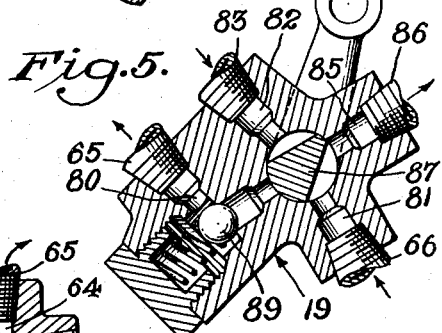
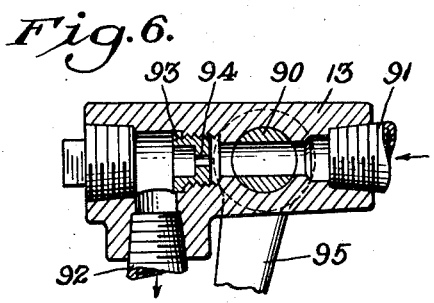
Inventor
Abner Doble
BY
Thiess, Olson & Mecklenburger
Attorneys.

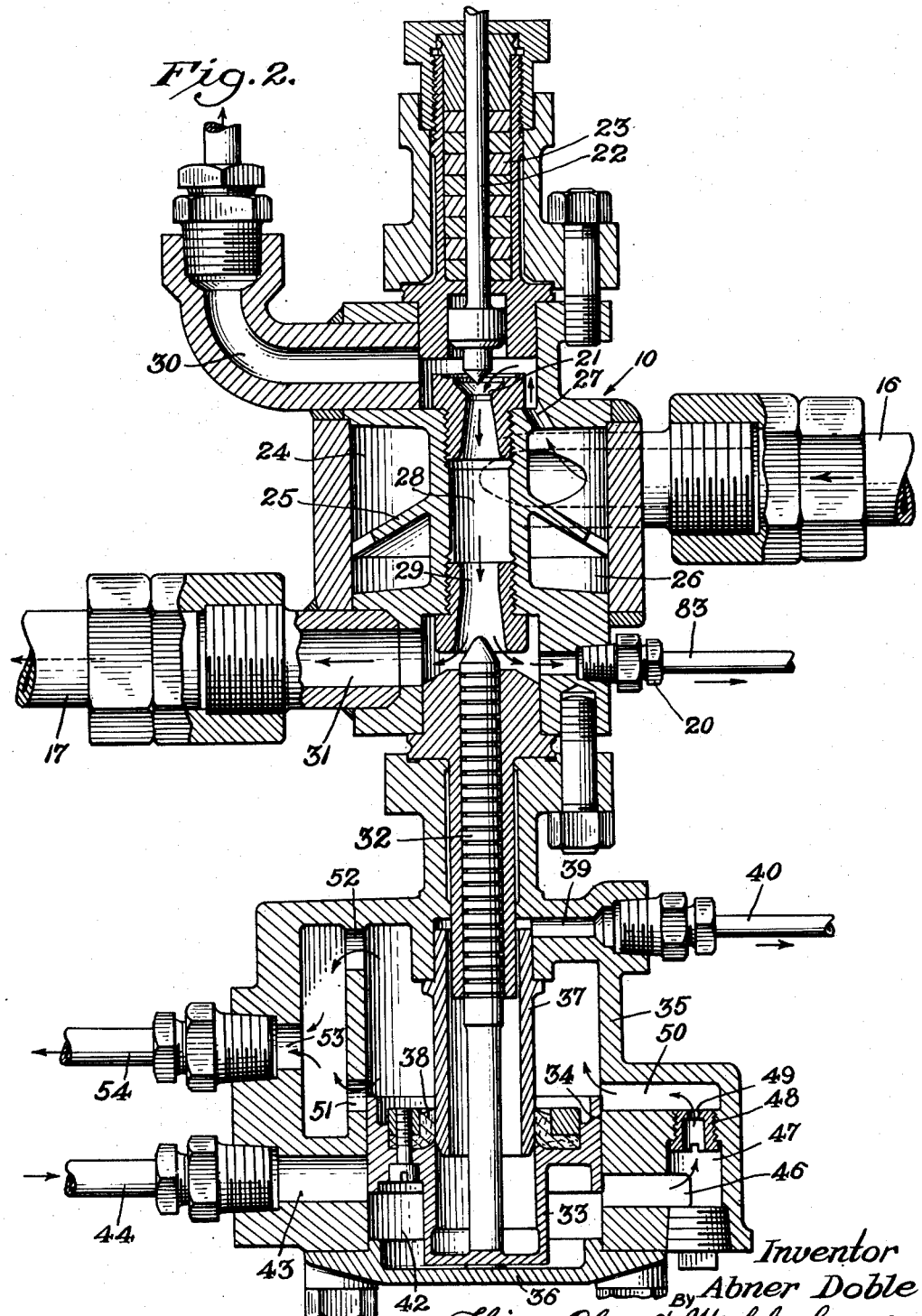

Patented Apr. 27, 1948

2,440,328

UNITED STATES PATENT OFFICE 2,440,328

SPEED AND CUTOFF CONTROL MEANS FOR STEAM ENGINES AND THE LIKE

Abner Doble, Chicago, Ill., assignor to Stanley Steam Motors Corporation, Chicago, Ill., a corporation of Delaware Application January 17, 1944, Serial No. 518,517

12 Claims. (Cl. 121—143)

This invention relates to control means for elastic fluid engines such as steam engines, more particularly to speed control and cut-off control means for automatically insuring the proper operation of vehicle-propelling steam engines under varying load conditions, and the invention has for an object the provision of improved, compact and reliable control means of this character.

Although the invention is not limited thereto, it is particularly applicable to and will be described in connection with steam engines for use on buses or similar vehicles. The size of the steam engine required for propelling a bus or similar vehicle is determined by the maximum tractive effort which must be exerted in starting the bus under the most adverse conditions of load and grade. It is of course desirable to utilize the smallest possible engine, which will obviously be an engine that will develop this maximum tractive effort when the valve gear of the engine is in its so-called full or long cut-off position. The efficiency of the engine during operation on full or long cut-off is not as high as when operating with the optimum or short cut-off, but the maximum tractive effort will be required for only a small portion of the time that the vehicle is in operation, and accordingly, during the remainder of the operating time, the engine may be operated with a reduced or short cut-off selected to obtain the highest engine efficiency.

The correct cut-off for insuring maximum engine efficiency of course varies with the speed and the load, and it has been found that vehicle operators, no matter how skillful or conscientious, will ordinarily not select the proper cut-off condition. Furthermore, it is desirable, for reasons of safety and for passenger comfort in the case of passenger vehicles, automatically to limit the speed of the vehicle to a safe value rather than to depend upon the operator's judgment. It is likewise desirable to limit the engine speed during idling periods when the engine is driving only the auxiliary equipment, and all of these limitations should be obtained without imposing any limitations on the operator's ability to secure, merely by manipulating the throttle, the required engine performance within the maximum speed limits. Accordingly, it is a further object of this invention to provide automatic control means which is effective, under all conditions of speed and load, to alter the cut-off condition and the amount of steam admitted to the engine so as to provide maximum engine efficiency while at the same time imposing maximum limits on the permissible engine speeds.

In carrying out the invention in one form, a steam engine of suitable construction, having a throttle adapted to be manipulated by the operator and having a variable cut-off reversing valve gear, is provided with pressure-operated governing means interposed in the steam passageway between the throttle and the engine, with a pressure-operated means for controlling the cut-off of the valve gear, and with pressure-producing means, such for example as an engine-driven, positive displacement oil pump for producing a flow of fluid which varies in proportion to the speed of the engine. The pressure-operated governing and cut-off control means are connected with the output of the oil pump in parallel relation to each other, so that a predetermined portion of the oil flowing from the pump when the engine is operating is directed to each of the pressure-operated means, properly proportioned restricting orifices being provided in the flow path of each pressure-operated means so as to effect a predetermined proportioning of the flow to each pressure-operated means from the oil pump. In addition, a normally open by-pass connected to the output side of the oil pump is provided around the two pressure-operated means, which by-pass is adapted to be closed upon declutching of the engine so as to increase the proportion of the oil flowing to the governing and cut-off control means during idling of the engine. The cut-off control means is so constructed as to be operable from a source of pressure other than the oil pump when it is desired to operate the valve gear to a reversing position to effect reverse operation of the steam engine. Preferably, the governing mans is so arranged that the pressure of the steam flowing therethrough tends to oppose the pressure exerted by the flow of oil through the governing means, and consequently a balanced governing operation is obtained which is dependent not only upon the speed conditions but also upon the pressure condition of the steam flowing through the manually controlled throttle.

For a more complete understanding of my invention, reference should now be had to the drawings in which:

Fig. 2 is a sectional elevational view of the governing means shown in outline in Fig. 1;

Fig. 3 is a sectional elevational view of the cut-off control means shown in outline in Fig. 1, with the plunger in a position corresponding to a long cut-off position of the valve gear;

Fig. 4 is a fragmentary view similar to Fig. 3 showing the plunger in its short cut-off position;

Figure 1:
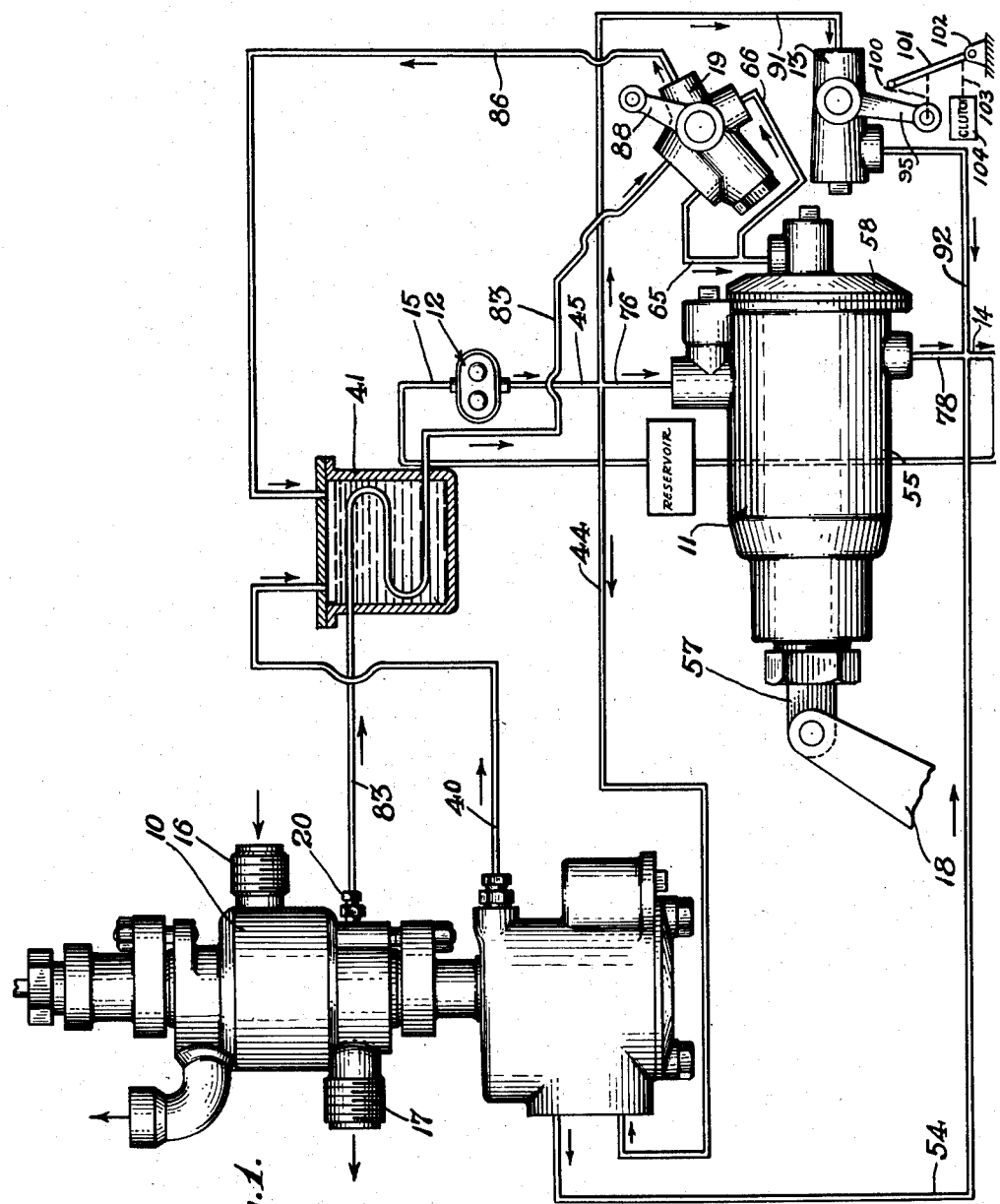
Fig. 1 is a diagrammatic illustration of automatic control means embodying the present invention, the associated steam engine and the valve gear therefor being omitted or indicated only diagrammatically in order to simplify the drawing.

Fig. 5 is a detailed sectional view of a two-position valve shown in outline in Fig. 1, which is employed in the embodiment of the invention shown for effecting operation of the control means of Figs. 3 and 4 to a reversing position; and Fig. 6 is a sectional view of the by-pass valve shown in outline in Fig. 1 for varying the operation of the governing and cut-off control means upon declutching of the engine to effect an idling operation thereof.

Referring now to the drawings, the control arrangement is shown in Fig. 1 as comprising a combined throttle and governing means 10, and a pressure-operated cut-off control means 11 connected through suitable conduits to a source of fluid pressure, such for example as an oil pump 12, whereby a flow of fluid pressure medium to the governing means and the cut-off control means is obtained. Also connected to the outlet side of the pump 12, as will be more fully described hereinafter, is a by-pass valve 13, the outlet connections from each of the devices 10, 11, and 13 being connected to a suitable oil return conduit 14 by means of which the oil or fluid pressure medium is returned to a reservoir (as shown) to which the inlet side of the pump 12 is connected by a suitable conduit 15.

As will be more fully described hereinafter, the throttle and governing means 10 is adapted to receive steam from a suitable boiler or other source of supply, not shown, through a connection 16, and to supply this steam through an outlet connection 17 to the engine through a suitable variable cut-off reversing valve gear of the type well known in the art, the operating arm of which is indicated diagrammatically by the member 18. Also illustrated diagrammatically in Fig. 1 is a two-position reversing valve 19 which, as will be more fully described hereinafter, is adapted to operate the cut-off control means 11 to a valve gear reversing position, the fluid pressure medium for effecting this reversing operation being obtained from a suitable bleeding connection 20 in the throttle and governing means 10.

No attempt has been made in Fig. 1 of the drawings to show the various connecting tubes and conduits in proper proportion to each other or to the various control elements of the control system either with respect to the cross-sectional dimensions or the lengths of the tubing, Fig. 1 being intended to indicate only the circuits through which the various fluid pressure mediums are conducted so as to effect the desired operation and control of the steam engine and the controlling means therefor.

As shown in Fig. 2, the combined throttle and governing means 10 is provided with a suitable throttle orifice 21 adapted to be controlled by a manually operable throttle member 22 which extends through a suitable packing gland 23. When steam is supplied through the connection 16 to the throttle and governing means 10, it is initially discharged into a swirl chamber 24 having an apertured baffle 25 therein, by means of which sediment or other impurities in the steam may be separated out into a sediment chamber 26.

From the swirl chamber 24 the steam passes through a suitable passageway 27 to one side of the throttle orifice 21 and thence through a vertical passageway 28 to a governing orifice 29 disposed immediately below the throttle orifice 21. Extending from the steam space above the throttle orifice 21 is a passageway 30 which, preferably, leads to a safety valve, not shown, of the type usually employed in connection with steam engine operation.

From the governing orifice 29 the steam flows through a lateral passageway 31 to the previously referred to outlet connection 17, from whence the steam is conducted to the engine. A portion of the steam flowing through the governing orifice 29 may be bled off through the connection 20, as previously indicated, and is utilized to effect the reversing operation of the valve gear when desired. Disposed below the governing orifice 29, for slidable movement into and out of the orifice so as to control the flow of steam therethrough, is a governing member 32 which is grooved, as shown, to provide the usual labyrinth type packing, and which is provided at its lower end with a piston having an axially extending portion 33 and an enlarged flange portion 34.

As shown, the enlarged flange portion 34 slidably engages the walls of a cylinder 35 for reciprocating movement therein, the extending portion 33 of the piston normally being adapted to engage the lower end wall or cover 36 of the cylinder 35. A suitable guide sleeve 37 is provided within the cylinder 35 for guiding the reciprocating movement of the piston and the governing member 32, and a suitable packing 38 is provided for preventing any steam or condensation which may leak past the governing member 32 from entering the cylinder 35. In order to provide for the return of any excess steam or condensate which may accumulate within the sleeve 37 and the hollow piston extension 33, a passageway 39 is provided having a conduit or return tube 40 connected thereto which, as shown in Fig. 1, extends to the hot well 41 of the steam generating system.

It will be observed that the extending end 33 and the flange 34 on the piston associated with the governor member 32 cooperate with the walls of the cylinder 35 and the end wall or cover 36 to form a pressure chamber 42, the piston forming a movable wall therein. Communicating with this pressure chamber 42 is a passageway 43 which is connected by suitable tubing or conduit 44, as shown best in Fig. 1, to the main outlet conduit 45 of the oil pump 12. Also communicating with the pressure chamber 42 is a transverse passageway 46 which terminates in a vertical passageway 47 in which is disposed a restricting member 48 having a flow controlling orifice 49 of predetermined size therein. The orifice 49, as shown in Fig. 2, communicates with a second transverse passageway 50 which in turn communicates with the space above the piston in the cylinder 35. Formed in one wall of the cylinder 35 is a pair of outlet or overflow ports 51 and 52 which communicate with a common outlet port 53, which outlet port is connected by a suitable tube or conduit 54 to the main return conduit 14 whereby the oil or other fluid pressure medium is returned to the reservoir to which the inlet side of the pump 12 is connected, as previously described.

When the oil pump 12 is being driven by the steam engine, it will of course be seen that oil will flow through the conduits 45, 44 into the pressure chamber 42 beneath the piston on the governing member 32, and from this chamber oil will flow through the passageways 46, 47, the restricting orifice 49 and the passageway 50 to the space above the piston, from whence it will return through the outlet or overflow ports previously described. So long as the rate of flow of the oil is less than the capacity of the orifice 49, no operation of the governor member 32 will be effected. As soon as the rate of flow of oil increases above the capacity of the orifice 49, however, a pressure will be built up within the pressure chamber 42 which will be effective to move the piston and governing member 32 upwardly so as to cause the upper end of the governing member 32 to move into the governing orifice 29. As soon as the governing member has moved far enough so that the flange portion 34 of the piston closes the passageway 50, the pressure within the chamber will build up more quickly and cause a rapid movement of the governing member 32 toward its full governing position. Although the outlet port 51 will likewise be closed, oil contained in the cylinder 35 above the piston will overflow through the port 52, and when the governing member has moved to its uppermost position the lower edge of the flange 34 on the piston will move beyond the lower edge of the overflow port 51 so as to prevent the pressure from building up further within the pressure chamber 42. With the governing member in this position it will be apparent that if the speed of the engine decreases so as to decrease the rate of flow produced by the oil pump, the piston and governing member will tend to move downwardly due to a reduction of the pressure in the chamber 42.

Since the upper end of the governing member 32 is directly exposed to the pressure of the steam flowing through the throttle orifice 21, it will be apparent that the position of the governing member will depend not only upon the pressure produced within the chamber 42 by the flow of oil thereto, but also upon the pressure of steam flowing through the throttle orifice. Consequently, a balanced governing action is obtained, and, as will be more fully pointed out hereinafter, the arrangement of the various parts of the pressure-operated governing means is such that the speed of operation of the steam engine will be limited to a predetermined maximum regardless of the manipulation of the throttle 22 by the operator.

The cut-off control means 11, as shown best in Fig. 3, comprises a cylindrical housing 55 having a packing gland 56 at one end thereof through which slidably extends a stem portion 57 of a suitable plunger or piston, the stem portion 57 being connected, as shown in Fig. 1, to the operating arm 18 of a suitable variable cut-off reversing valve gear (not shown) which may be of any suitable type well known in the art. Adjacent its other end the housing 55 is provided with a cover 58 having an inwardly extending hollow post 59, on the inner end of which is mounted a bearing member 60 for slidably engaging the interior of a hollow head 61 formed on the inner end of the plunger stem 57. Disposed on opposite sides of the bearing member 60 are suitable sealing washers 62 and 63 for preventing leakage between the bearing member 60 and the inner surface of the hollow head 61. Communicating with the interior of the hollow post 59 is a passageway 64 to which is connected, by suitable conduits 65 and 66, the control valve 19, as will be more fully described hereinafter.

Extending outwardly from the exterior of the hollow head 61 is a flange 67 having a rearwardly extending skirt portion 68 for slidably engaging the internal walls of the housing 55, the under side of the flange 67 being engaged by a coil spring 69 which surrounds the plunger or piston and is arranged with its other end bearing against a shoulder 70 in the housing 55. The spring 69 thus serves normally to bias the plunger to its extreme right-hand position shown in Fig. 3, which position, as will be more fully described hereinafter, corresponds to the full or long cut-off position of the valve gear 18.

The flange 67, in cooperation with the housing 55 and the cover 58 therefor, provides a pressure chamber 71, the surface of the flange 67 forming a movable wall for this pressure chamber. As shown in Fig. 3, a passageway 72 is provided communicating with this pressure chamber 71 and having disposed therein a restricting member 73 provided with a restricting orifice 74 which communicates with a further passageway 75 to which is connected a suitable conduit 76 leading from the main outlet conduit 45 of the oil pump 12, whereby a portion of the oil flowing from the outlet of the pump 12 will be conducted to the pressure chamber 71. An opposite wall of the housing 55 is provided, as shown best in Fig. 3, with an overflow passageway 77 which is connected by a tubing or conduit 78 to the oil return conduit 14 previously described.

When the pressure developed in the chamber 71 is sufficient to overcome the force of the spring 69, it will be apparent that the plunger formed by the hollow head 61 and the stem 57 will move to the left, as viewed in Fig. 3, thereby to operate the valve gear so as to vary the cut-off. In Fig. 4 the plunger is shown in a position corresponding to the short cut-off position of the valve gear, and it will be observed that the flange 67 on the plunger has now moved partially across the overflow passageway 77 so as to permit the overflow of oil from the pressure chamber 71 and thus prevent further building up of the pressure within this chamber.

It will thus be observed that as the rate of flow of oil into the pressure chamber 71 changes, the position of the plunger will be correspondingly changed between the long cut-off and the short cut-off positions, respectively shown in Figs. 3 and 4, so as properly to control the valve gear of the engine. When it is desired to effect reverse operation of the steam engine, it is only necessary to apply pressure to the interior of the hollow post 59 by proper manipulation of the reversing valve 19. As shown in Fig. 5, this reversing valve 19 is provided with a plurality of ports and connections whereby a pressure medium may be selectively applied to or exhausted from the hollow post 59. Thus the connecting tubes or conduits 65 and 66, which extend from the hollow post 59, are respectively connected to passageways 80 and 81 in the valve 19. An additional passageway 82 in the valve 19 is connected by a suitable tube or conduit 83 to the steam bleeding connection 20 in the throttle and governing means 10, an intermediate portion of the conduit 83 passing in heat exchange relation through the hot well 41 of the steam engine. Likewise, a fourth passageway 85 in the valve 19 is connected by a tubing or conduit 86 so as to exhaust into the hot well 41. The valve 19 includes a movable element 87 adapted to be operated by a handle 88 which may be suitably connected to or controlled by the usual reversing lever of the steam engine.

When the valve member 87 is in the position shown in Fig. 5, it will be apparent that the interior of the hollow post 59 in the cut-off control means 11 will be connected through the conduit 66, passageways 81 and 85, and the conduit 86 to the hot well so as to exhaust therefrom any steam or hot condensate which might be present in the hollow post 59. If, however, the valve member 87 is rotated in a counter-clockwise direction, as viewed in Fig. 5, so as to disconnect the passageways 81 and 85 and connect the passageways 80 and 82, steam pressure will be applied from the bleeding connection 20 and the conduit 83 through the passageways 82 and 80, and the conduit 65 to the interior of the hollow post 59. This steam pressure, acting on the inner end surface of the hollow head 61, will immediately force the plunger and stem 57 to an extreme left-hand position which corresponds to the reversing position of the valve gear. It will likewise be observed that operation of the plunger 57 to its reversing position will be effected by the application of steam pressure to the interior of the hollow post 59, regardless of the pressure conditions which may exist in the chamber 71.

As shown in Fig. 5, an automatic ball check valve 89 is provided in the passageway 80 for preventing the return flow of steam or condensate through the conduit 65, and accordingly the plunger will be maintained in reversing position upon operation thereto until such time as the reversing valve 19 is returned to the position shown in Fig. 5 to connect the interior of the hollow post 59 to the hot well 41 through the conduits 66 and 86.

During those periods when the bus or vehicle is standing in a station or during other stoppages, it may be necessary to operate the steam engine in order to operate the air conditioning apparatus, air brake compressors, electric generators, or similar auxiliary equipment. During such idling periods it is important that the speed of the engine be limited to the lowest speed at which the desired output from the auxiliary equipment will be obtained. The speed limitation placed on the engine by the governing means 10 when the engine is driving the vehicle, is of course not a satisfactory limitation when the engine is declutched or taken out of driving relationship with the vehicle, and accordingly means are provided for altering the operation of the governing means upon declutching of the engine. The by-pass valve 13, as shown in Figs. 1 and 6, includes a rotary valve member 90 for controlling the flow of oil from an inlet conduit 91 to an outlet conduit 92, a suitable restricting member 93 having an orifice 94 being disposed in the by-pass valve 13 between the inlet and outlet sides thereof.

As shown best in Fig. 1, the inlet conduit 91 is connected to the main output conduit 45 of the pump 12, and the outlet conduit 92 of the by-pass valve 13 is connected to the main oil return conduit 14. Thus the valve 13 is in by-passing relation both to the governing means 10 and the cut-off control means 11, so that when the valve member 90 is in the by-passing position shown in Fig. 6 a predetermined quantity of oil from the pump 12 will flow through the by-pass conduits 91 and 92 and thus limit the amount of oil supplied to the devices 10 and 11. The valve 13 is provided with an operating arm 95 which may be moved in a counterclockwise direction from the position shown in Fig. 6 so as to close the connection between the conduits 91 and 92, and this operating arm 95 is preferably connected by any suitable means to the instrumentality for declutching the engine. In Fig. 1 the operating arm 95 of the valve 13 is shown by way of example as being connected through suitable linkage 100 to the clutch-operating member 101 which is pivoted as shown on a suitable pivot 102 and connected by other linkage 103 to a clutch which serves to connect the engine to and disconnect the engine from the driving wheels of the vehicle, the clutch being indicated diagrammatically and identified by the reference numeral 104. The clutch-operating lever 101 is shown in Fig. 1 in the position occupied thereby when the engine is clutched in driving relation to the vehicle, and it will be apparent that when the lever 101 is operated in a clockwise direction to declutch the engine the arm 95 will be rotated by the linkage 100 in a counterclockwise direction to close the by-pass valve 13 as hereinbefore described. When the engine is declutched and the by-pass valve 13 thus closed, it will be apparent that an increased proportion of the total oil pumped by the pump 12 will flow to the devices 10 and 11 so that operation of both the governing means and the control means will be effected at lower engine speeds.

With the above description of the various instrumentalities and interconnections of the control devices shown in the drawings, it is thought that a complete understanding of the invention may be had from a description of the operation of the control means under various speed and load conditions of a vehicle being driven by a steam engine. It will first be assumed that the engine is connected in driving relationship to the vehicle so as to start the vehicle from a standstill under a relatively light load. Under these conditions the oil pump 12, which is of the positive displacement type and is indicated diagrammatically in the drawings as being of the gear type, will produce a flow of oil proportional to the speed of the engine. The by-pass valve being opened, the proportion of the total oil flow which will be directed to the governing means 10 and the cut-off control means 11 will depend upon the respective sizes of the restricting orifices 49, 74 and 94. These orifices may be so selected as to provide for operation of the various devices at the desired speeds, as will be hereinafter explained.

Since the plunger in the cut-off device 11 occupies the long cut-off position illustrated in Fig. 3, a pressure will immediately begin to build up against the flange surfaces 67, tending to operate the plunger in a left-hand direction toward its short cut-off position. In one embodiment of the invention, the long cut-off position shown in Fig. 3 was adjusted to provide approximately 85% cut-off. Simultaneously the portion of the oil flow which enters the governing means 10 is by-passed around the piston on the governing member 32 through the orifice 49, and it will be apparent that the size of this orifice will determine the rate at which pressure builds up in the pressure chamber 71 of the cut-off control means 11. As the volume of oil flowing increases with an increase of the oil pump speed, the back pressure in the cut-off control device 11 increases, and consequently an increased flow of oil to the governing means 10 occurs due not only to the increased speed of the pump, but also to the fact that an increased proportion of the oil flow is directed to the governing means.

Since the vehicle is starting under light load only, the steam pressure on the upper end of the governing member 32 will be less than the maximum available steam pressure, and the governing member 32 will begin to rise as soon as the amount of oil flowing into the pressure chamber 42 through the conduit 44 exceeds the capacity of the restricting orifice 49. As soon as the governing member 32 has risen far enough so as to close the by-pass around the piston through the orifice 49, pressure will build up quickly in the chamber 42 and a consequent increase in the proportion of oil flowing to the cut-off control means 11 will occur so as to increase the speed of movement of the plunger in the pressure chamber 71, and when the engine reaches a predetermined speed the valve gear 18 will be operated by the plunger in the control means 11 to the short cut-off position shown in Fig. 4. In one embodiment of the invention the various devices were so proportioned and arranged as to provide for a shift to short cut-off operation at a vehicle speed of approximately 5 miles per hour, the cut-off being approximately 50% in the short cut-off position.

If the vehicle is starting under heavy load, the operation will be substantially as described above, with the difference that the throttle 22 will of course be opened wider and substantially maximum steam pressure will be exerted on the upper end of the governing member 32 so that upward movement of this governing member will not take place until a somewhat greater pressure has built up within the pressure chamber 42 in the control means 10. Consequently, the by-pass through the orifice 49 will not be closed until the vehicle has reached a somewhat greater speed, say for example about 16 miles per hour, and consequently operation of the cut-off control means 11 to its short cut-off position will not occur until this higher vehicle speed is reached.

It will now be assumed that the vehicle is operating at a speed of somewhere between 5 and 16 miles per hour at short cut-off, after having started under light load, and that a sudden increase in load occurs due, for example, to a heavy grade. The operator may open the throttle in order to maintain a desired speed or even to accelerate the vehicle, and the increased steam pressure on the upper end of the governing member 32 will tend to move the associated piston downwardly in the pressure chamber 42 so as to open the by-pass around the piston through the orifice 49. If the increased steam supply is insufficient to maintain the speed of the vehicle at the increased load, so that the vehicle tends to slow down, the flow of oil from the pump 12 will consequently decrease. The combined effect of the decreased oil supply and the opening of the by-pass through the orifice 49, or the separate effect of either depending upon the speed and load conditions, will serve substantially to diminish the amount of oil being supplied to the cut-off control means 11, and consequently the plunger will move toward the full cut-off position shown in Fig. 3 and will not return to the short cut-off position until the speed of the vehicle increases so as to provide a larger flow of oil or until the steam pressure on the governor plunger 32 decreases sufficiently due to changed conditions of operation, such as a reduction of load or a manipulation of the throttle, the decrease in steam pressure resulting in closure of the by-pass orifice 49.

If it is assumed now that the vehicle is operated at a relatively high speed under short cut-off conditions, and that the operator of the vehicle opens the throttle so as to increase the supply of steam to the engine and thus produce a higher vehicle speed, it will be observed that the increased flow of oil from the pump 12 will, in the main, be diverted to the governor control means 10, the amount of oil flowing through the cut-off control means 11 and the by-pass valve 13 being determined by the respective sizes of the orifices 74 and 94. This increased flow of oil to the pressure chamber in the governing means 10 will of course cause further upward movement of the piston and governing member 32 until the governing member 32 extends into the orifice 49 to its full governing position. In this position the lower edge of the portion 34 on the piston will uncover the overflow port 51 so that further upward movement of the governing member will be prevented, but so long as the speed of the engine is maintained sufficiently high to produce the required amount of oil flow the governing member will be maintained in this uppermost position and will thus limit the amount of steam which may be supplied to the engine through the governing orifice 29. In one embodiment of the invention the various devices and parts were so proportioned as to provide a maximum engine speed of 60 miles per hour beyond which the operator could not go, regardless of his manipulation of the throttle due to the fact that the governing member would automatically limit the supply of steam to the engine. As soon as the speed of the vehicle decreases from this maximum speed, due either to an increase in load or to the manipulation of the throttle 22, the governing member will tend to move downwardly and increase the amount of steam supplied to the engine so as to maintain the full torque necessary for proper operation of the vehicle.

As heretofore indicated, it is desirable, when the bus is standing in a station, to declutch the engine from driving relationship and yet to maintain the engine in operation for the purpose of driving the auxiliary equipment. Upon declutching the engine, the by-pass valve 13 will be operated from the position shown in Fig. 6 to a position in which the by-pass conduits 91 and 92 are closed, and consequently a much lower speed of operation of the engine will cause the plunger in the control device 11 to operate to its short cut-off position and cause the governing member 32 in the governing means 10 to operate to its uppermost or full governing position. In one embodiment of the invention where the governing means was adjusted to provide an engine speed of approximately 1800 R. P. M. with the vehicle in operation and the by-pass valve 13 open, closure of the by-pass valve would so alter the governing characteristics as to provide a maximum idling speed of 600 R. P. M.

If at any time it is desired to reverse the steam engine so as to back up the bus or vehicle, it is necessary only to operate the valve arm 88 of the reversing valve 19 to the reversing position, as hereinbefore described, so as to connect the steam conduit 83 to the conduit 85 and thus supply high pressure steam and condensate to the pressure chamber provided at the inner end of the hollow post 59 in the control means 11. The pressure thus exerted on the inner surface of the hollow head 61 will immediately operate the plunger of the cut-off control means 11 to an extreme left-hand position corresponding to the reversing position of the valve gear 18. Termination of the reversing operation may be accomplished merely by returning the operating arm of the reversing valve 19 to the exhaust position shown in Fig. 5, so as to connect the hollow post 59 to exhaust through the conduits 66 and 86, which latter conduit exhausts into the hot well 41. Although it is of course not essential that the conduit 83, extending from the bleeding connection 20 to the valve 19, pass through the hot well, as shown in Fig. 1 of the drawings, such an arrangement is deemed desirable for the purpose of recovering a portion of the heat energy contained in the steam and reducing the temperature of the pressure medium supplied through the valve 19 to the control means 11. A mixture of steam and hot condensate may thus be supplied to the pressure chamber at the inner end of the hollow post 59, and the return spring 69 in the cut-off control means 11 should of course be sufficiently strong to effect exhaust of this pressure medium whenever the valve 19 is operated to the exhaust position.

It will now be apparent that there is provided, in accordance with this invention, an improved governing means wherein a pressure proportional to the speed of the engine is balanced against the steam pressure to provide automatic governing of the engine speed in accordance with the load conditions, and the governing means and the cut-off control means are so correlated that operation of either influences the other, whereby a completely correlated and automatic control of the engine is obtained under various speed and load conditions.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. In combination with a steam engine, a throttle, governing means intermediate said engine and throttle including a member movable to control the flow of steam from said throttle and thereby limit the maximum speed of said engine, means for producing a flow of fluid varying in proportion to said engine speed, a pressure chamber having a movable wall connected to said governing member, means for conducting at least a portion of the fluid through a closed circuit extending from the outlet to the inlet of said flow-producing means and including said chamber to produce a pressure in said chamber tending to move said wall and governing member toward a speed-limiting governing position, means forming a second closed circuit for said fluid in parallel relation to said chamber, and means in said second circuit for varying the portion of the fluid flow from said flow-producing means supplied to said chamber to vary the maximum engine speed established by said governing means.

2. In combination with a steam engine, a throttle, governing means intermediate said engine and throttle including a member movable to control the flow of steam from said throttle and thereby limit the maximum speed of said engine, said member having a surface thereof disposed so that the pressure of the steam admitted through said throttle urges said member toward a fully open position, means for producing a flow of liquid varying in proportion to said engine speed, a pressure chamber having a movable wall connected to said governing member, means including a closed liquid flow circuit extending from the outlet to the inlet of said flow-producing means and including said chamber for supplying at least a portion of the liquid flow to said chamber, means forming a restricted outlet from said chamber whereby a flow of liquid to said chamber in excess of the capacity of said outlet produces a pressure in said chamber tending to move said wall and said governing member against the force exerted on said member by said steam pressure, means responsive to a predetermined movement of said member for opening a discharge outlet from said pressure chamber to limit the pressure in said chamber at excessive vehicle speeds, means forming a second closed liquid flow circuit in parallel relation to said chamber, and means in said second circuit for varying the portion of said liquid flow from said flow-producing means supplied to said chamber to vary the maximum engine speed established by said governing means.

3. In combination with a steam engine, a throttle, governing means intermediate said engine and throttle including a member movable to control the flow of steam from said throttle and thereby limit the maximum speed of said engine, means for producing a flow of fluid varying in proportion to said engine speed, a pressure chamber having a movable wall connected to said governing member, means for conducting at least a portion of the fluid from said flow-producing means to said chamber to produce a pressure therein tending to move said wall and governing member toward a speed-limiting governing position, by-pass means connected to said flow-producing means in parallel relation to said conducting means for normally by-passing a predetermined portion of the fluid flow around said governing means to predetermine the range of speed control effected by said governing means, and valve means operable upon declutching of said engine from its load for closing said by-pass means to lower the speed control range of said governing means during idling of said engine.

4. In combination with a steam engine having a variable cut-off valve gear, an operating plunger connected to said valve gear and normally biased to a position corresponding to full cut-off, a pressure chamber having one wall formed by a surface of said plunger, means for producing a flow of fluid varying in proportion to the speed of said engine, means for supplying at least a portion of said fluid flow to said pressure chamber to produce a pressure on said surface tending to move said plunger toward a short cut-off position, said pressure chamber having a normally closed overflow port adapted to be opened when said plunger reaches said short cut-off position, and means for varying in accordance with an operating condition of said engine the portion of said fluid flow supplied to said pressure chamber from said flow-producing means to vary the engine speed at which said short cut-off is established.

5. In combination with a steam engine having a variable cut-off valve gear, an operating plunger connected to said valve gear and normally biased to a position corresponding to full cut-off, a pressure chamber having one wall formed by a surface of said plunger, means for producing a flow of fluid varying in proportion to the speed of said engine, means for supplying at least a portion of said fluid flow to said pressure chamber to produce a pressure on said surface tending to move said plunger toward a short cut-off position, said pressure chamber having a normally closed overflow port adapted to be opened when said plunger reaches said short cut-off position, by-pass means connected to said flow-producing means for normally by-passing a predetermined portion of the said fluid flow around said pressure chamber, and means for controlling said by-pass means to vary said by-passed portion and alter the engine speed at which said short cut-off is established.

6. In combination with a steam engine having a variable cut-off valve gear, an operating plunger connected to said valve gear and normally biased to a position corresponding to full cut-off, a pressure chamber having one wall formed by a surface of said plunger, means for producing a flow of fluid varying in proportion to the speed of said engine, means for supplying at least a portion of said fluid flow to said pressure chamber to produce a pressure on said surface tending to move said plunger toward a short cut-off position, said pressure chamber having a normally closed overflow port adapted to be opened when said plunger reaches said short cut-off position, by-pass means connected to said flow-producing means for normally by-passing a predetermined portion of the said fluid flow around said pressure chamber, and valve means operable upon declutching of said engine for closing said by-pass means to insure short cut-off operation during idling of said engine.

7. In combination with a steam engine having a variable cut-off reversing valve gear, an operating plunger connected to said valve gear and normally biased toward a position corresponding to long cut-off forward operation, a first pressure chamber having one wall formed by a surface of said plunger, means for producing a flow of fluid varying in proportion to the speed of the engine, means for conducting at least a portion of said fluid flow to said first pressure chamber to produce a pressure on said surface tending to move said plunger toward a short cut-off position, said pressure chamber having a normally closed overflow port adapted to be opened when said plunger reaches said short cut-off position, a second pressure chamber having one wall thereof movable to operate said plunger, means for supplying a fluid pressure medium to said second chamber to operate said plunger to a reversing position beyond said short cut-off position independently of the pressure in said first chamber, and means for exhausting said second chamber to permit said plunger to return to a cut-off position determined by the flow of fluid into said first chamber.

8. In combination with a steam engine having a throttle and a variable cut-off reversing valve gear, an operating plunger connected to said valve gear and normally biased toward a position corresponding to long cut-off forward operation, a first pressure chamber having one wall formed by a surface of said plunger, means for producing a flow of fluid varying in proportion to the speed of the engine, means for conducting at least a portion of said fluid flow to said first pressure chamber to produce a pressure on said surface tending to move said plunger toward a short cut-off position, said pressure chamber having a normally closed overflow port adapted to be opened when said plunger reaches said short cut-off position, a second pressure chamber having one wall thereof movable to operate said plunger, means for supplying steam from the engine side of the throttle to said second chamber to operate said plunger to a reversing position beyond said short cut-off position independently of the pressure in said first chamber, check valve means in said steam supplying means for retaining said plunger in said reversing position upon operation thereto regardless of variations in the steam pressure at the engine side of said throttle, and means for exhausting said second chamber to permit said plunger to return to a cut-off position determined by the flow of fluid into said first chamber.

9. In combination with a steam engine having a variable cut-off reversing valve gear, an operating plunger connected to said valve gear and normally biased toward a position corresponding to long-cut-off forward operation, a first pressure chamber having one wall formed by a surface of said plunger, means for producing a flow of fluid varying in proportion to the speed of the engine, means for conducting at least a portion of said fluid flow to said first pressure chamber to produce a pressure on said surface tending to move said plunger toward a short cut-off position, said pressure chamber having a normally closed overflow port adapted to be opened when said plunger reaches said short cut-off position, by-pass means connected to said flow-producing means for normally by-passing a portion of the fluid flow from said flow-producing means around said first pressure chamber, valve means operable upon declutching of said engine for closing said by-pass means to insure short cut-off operation during idling of said engine, a second pressure chamber having one wall thereof movable to operate said plunger, means for supplying a fluid pressure medium to said second chamber to operate said plunger to a reversing position beyond said short cut-off position independently of the pressure in said first chamber, and means for exhausting said second chamber to permit said plunger to return to a cut-off position determined by the flow of fluid into said first chamber.

10. In combination with a steam engine having a variable cut-off reversing valve gear, an operating plunger connected to said valve gear and normally biased toward a position corresponding to long cut-off forward operation, a first pressure chamber having one wall formed by a surface of said plunger, means for producing a flow of fluid varying in proportion to the speed of the engine, means for conducting at least a portion of said fluid flow to said first pressure chamber to produce a pressure on said surface tending to move said plunger toward a short cut-off position, said pressure chamber having a normally closed overflow port adapted to be opened when said plunger reaches said short cut-off position, by-pass means connected to said flow-producing means for normally by-passing a portion of the fluid flow from said flow-producing means around said first pressure chamber, valve means operable upon declutching of said engine for closing said by-pass means to insure short cut-off operation during idling of said engine, a second pressure chamber having one wall thereof movable to operate said plunger, means for supplying steam from the engine side of the throttle to said second chamber to operate said plunger to a reversing position beyond said short cut-off position independently of the pressure in said first chamber, check valve means in said steam supplying means for retaining said plunger in said reversing position upon operation thereto regardless of variations in the steam pressure at the engine side of said throttle, and means for exhausting said second chamber to permit said plunger to return to a cut-off position determined by the flow of fluid into said first chamber.

11. In combination with a steam engine having a throttle operable under the control of an operator and a variable cut-off valve gear, governing means including a member movable to control the flow of steam from said throttle and thereby limit the maximum speed of said steam engine, control means for said valve gear including a plunger connected to said valve gear and biased to a position corresponding to full cut-off, a first pressure chamber having a movable wall connected to said governing member, a second pressure chamber having a movable wall portion thereof formed by said plunger, means for producing a flow of fluid varying in proportion to the engine speed, means for conducting a portion of said fluid flow to each of said pressure chambers to produce a pressure in said first chamber tending to move said governing member toward a speed-limiting governing position and to produce a pressure in said second chamber tending to move said plunger toward a short cut-off position, by-pass means connected to said flow-producing means for normally by-passing a predetermined portion of said fluid flow around said pressure chambers, and valve means operable upon declutching of said engine for closing said by-pass means to effect low speed operation at short cut-off during idling of said engine.

12. In combination with a steam engine having a throttle operable under the control of an operator and a variable cut-off valve gear, governing means including a member movable to control the flow of steam from said throttle and thereby limit the maximum speed of said steam engine, said governing member having a surface so disposed that the pressure of the steam admitted through said throttle urges said member toward a fully open position, control means for said valve gear including a plunger connected to said valve gear and biased to a long cut-off position, a first pressure chamber having a movable wall connected to said governing member, a second pressure chamber having a movable wall formed by said plunger, means for producing a flow of fluid varying in proportion to the engine speed, means connecting said pressure chambers to said flow-producing means in parallel relation to each other whereby a predetermined portion of said flow is conducted to each chamber to produce in said first chamber a pressure tending to move said governing member against said steam pressure and to produce in said second chamber a pressure tending to move said plunger toward a short cut-off position, and means responsive to initial movement of said governor member for increasing the portion of said fluid flow conducted to said second pressure chamber, whereby operation of said plunger to said short cut-off position is jointly dependent upon the speed of said engine and the pressure of the steam admitted through said throttle.

ABNER DOBLE.

REFERENCES CITED

The following references are of record in the file of this patent:

UNITED STATES PATENTS

| Number | Name | Date |
|---|---|---|
| 571,834 | Immendorf et al. | Nov. 24, 1896 |
| 760,052 | Andrews | May 17, 1904 |
| 1,027,221 | Strain | May 21, 1912 |
| 1,042,534 | Dawley | Oct. 29, 1912 |
| 1,047,836 | Pilling | Dec. 17, 1912 |
| 1,129,009 | Petermoller | Feb. 16, 1915 |
| 1,177,895 | Raymond | Apr. 4, 1916 |
| 1,533,767 | Schmidt | Apr. 14, 1925 |
| 1,566,995 | Standerwick | Dec. 22, 1925 |
| 1,685,868 | Schleyer | Oct. 2, 1928 |
| 1,807,173 | Ray | May 26, 1931 |
| 2,257,892 | Van Sittert et al. | Oct. 7, 1941 |
| 2,326,396 | Schaedler | Aug. 10, 1943 |
| 2,375,490 | Overly | May 8, 1945 |

FOREIGN PATENTS

| Number | Country | Date |
|---|---|---|
| 463,310 | Great Britain | Mar. 24, 1937 |
| 475,693 | Great Britain | Nov. 24, 1937 |